United States Patent
Lawes

(10) Patent No.: US 6,877,679 B2
(45) Date of Patent: Apr. 12, 2005

(54) FUEL INJECTOR

(76) Inventor: Keith Trevor Lawes, Poole House, 21 Thames Street, Poole, Dorset BH15 IJN (GB)

( * ) Notice: Subject to any disclaimer, the term of this patent is extended or adjusted under 35 U.S.C. 154(b) by 128 days.

(21) Appl. No.: 10/182,428
(22) PCT Filed: Jan. 26, 2001
(86) PCT No.: PCT/GB01/00302
§ 371 (c)(1),
(2), (4) Date: Oct. 31, 2002
(87) PCT Pub. No.: WO01/55584
PCT Pub. Date: Aug. 2, 2001

(65) Prior Publication Data
US 2003/0155444 A1 Aug. 21, 2003

(30) Foreign Application Priority Data

Jan. 27, 2000 (GB) ............................................. 0001751
Jul. 5, 2000 (GB) ............................................. 0016408

(51) Int. Cl.$^7$ .......................... B05B 1/30; F02M 51/00; F16K 31/02; F16K 37/00; E03B 7/07
(52) U.S. Cl. ............... 239/585.1; 137/554; 251/129.04
(58) Field of Search .......................... 239/585.1, 585.2, 239/585.3, 585.4, 585.5; 137/554; 251/129.04; 123/490, 499

(56) References Cited

U.S. PATENT DOCUMENTS

| 4,327,695 A | | 5/1982 | Schechter |
| 4,718,386 A | * | 1/1988 | Gieles ........................ 123/472 |
| 5,076,499 A | * | 12/1991 | Cranford .................. 239/585.2 |
| 5,433,244 A | * | 7/1995 | Sule ............................ 137/554 |
| 5,595,215 A | * | 1/1997 | Wallace et al. ............. 137/554 |
| 5,687,050 A | * | 11/1997 | Bartsch ...................... 361/154 |
| 5,738,071 A | * | 4/1998 | Smith et al. ................ 123/357 |
| 5,895,844 A | | 4/1999 | Krueger |

FOREIGN PATENT DOCUMENTS

GB 2052794 1/1981

* cited by examiner

Primary Examiner—David A. Scherbel
Assistant Examiner—Darren Gorman
(74) Attorney, Agent, or Firm—Christensen O'Connor Johnson Kindness PLLC

(57) ABSTRACT

A conventional fuel injection system meters fuel by varying the time for which the injector is open. This is an empirical rather than fundamental method of metering the fuel. The amount of fuel delivered for a given injector opening time will depend on the pressure difference across the injector orifice and the exact dimensions of the injector orifice. Both these parameters are subject to variation. An injector (1) which comprises a plunger (2), a solenoid coil (3), and a conical return spring (11) which is driving a primary high pressure pump assembly consisting of a primary piston (4) within a primary cylinder (5) together with primary inlet valve (8) and primary outlet valve (7). The plunger (2) is also driving a secondary low pressure pump assembly consisting of a secondary piston (22), secondary cylinder (23), secondary inlet valve (24) and secondary outlet valve (25). The solenoid coil (3) is under the control of an electronic monitor unit (10) which is connected to the solenoid coil (3) via two connecting wires (19). The injector is mounted in and is delivering fuel into an inlet manifold (20). By interrogating various sensors around the engine the electronic monitor unit (10) calculates the amount of fuel it wishes to deliver. From a simple volumetric calculation the electronic monitor unit (10) calculates how far the piston (4) must be moved to deliver this amount of fuel.

34 Claims, 2 Drawing Sheets

FUEL INJECTOR

Figure 1:
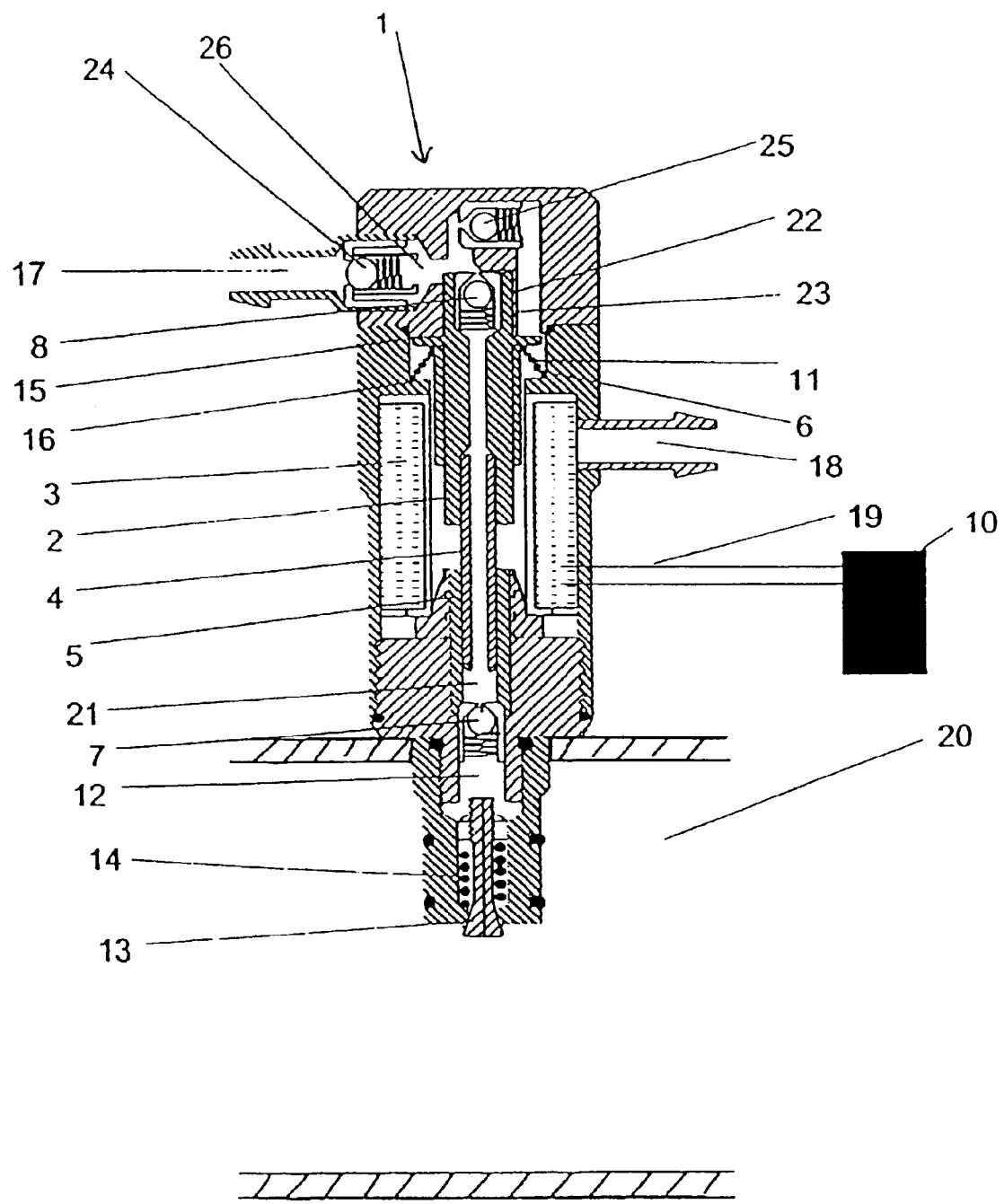

This is a United States national stage application of International application No. PCT/GB01/00302, filed Jan. 26, 2001, the benefit of the filing date of which is hereby claimed under 35 U.S.C. § 120, which in turn claims the benefit of United Kingdom application No. 0001751.7, filed Jan. 27, 2000, and United Kingdom application No. 0016408.7, filed Jul. 5, 2000, the benefit of the filing date of which is hereby claimed under 35 U.S.C. § 119.

The present invention relates to a fuel injector and is concerned particularly with a fuel injector comprising an electronically controlled fuel injection system for a gasoline engines.

At present fuel injectors are used to inject a fuel spray into inlet a manifold or a cylinder of an engine. These types of injectors must be capable of two basic functions. Firstly they must be able to deliver a metered amount of fuel for each inlet stroke of the engine so that a suitable air fuel ratio can be maintained. Secondly they must atomise the fuel by forcing it through a small orifice at high pressure to improve the efficiency of the combustion process.

Conventional fuel injection systems use fuel injectors comprise a simple solenoid controlled valves. These valves are not proportional but are either fully open or fully closed. The injectors are linked to an external high pressure fuel supply consisting of a fuel pump, high pressure fuel lines and a pressure regulator. The fuel pressure is typically between 2 and 4 bar. The fuel is metered by varying the time for which the injectors are open. The fuel is atomised by forcing it through a precisely dimensioned small orifice in the injectors.

The external high pressure fuel system is expensive and bulky. It also presents a potential safety hazard as any breach in the fuel lines will result in a rapidly expanding fuel mist which is extremely flammable. The present invention does not require a high pressure fuelling system and thus reduces both system cost and risk.

A conventional fuel injection system meters fuel by varying the time for which the injector is open. This is an empirical rather than fundamental method of metering the fuel. The amount of fuel delivered for a given injector opening time will depend on the pressure difference across the injector orifice and the exact dimensions of the injector orifice. Both these parameters are subject to variation. The pressure difference will vary due To both the fuel pressure varying on the inside of the injector and the pressure in the inlet or cylinder varying on the outside of the injector. The fuel pressure will vary in the short term with system voltage and pulses from the fuel pump, and in the long term as the regulator ages, and any fuel filters in the system clog up. The pressure in the inlet manifold or cylinder will vary with load and engine speed, and will also change as engine components wear. The effective dimensions of the atomisation orifice may vary due to blockage or wear. All of these effects will result in an error in the amount of fuel delivered for a given injector opening time. The present invention meters the amount of fuel delivered from first principles using a simple volumetric calculation and is thus not subject to these sources of error.

GB 2052794A discloses a fuel injector comprising a first solenoid connected to a valve assembly, the first solenoid opening the valve assembly to dispense fuel from the valve assembly when an electric current is applied to the first solenoid. A second solenoid is used to measure the distance the first solenoid moves and varies the current flowing through the second solenoid to vary the amount of fuel dispensed.

According to a first aspect of the invention there is provided a fuel injector comprising an electrical actuator comprising a solenoid coil and a movable plunger; a pump assembly comprising piston means being movable by the electrical actuator; and monitoring means for controlling the amount of fuel dispensed, the arrangement being such that in use fuel is dispensed from the fuel injector by the movement of the plunger and the piston means, and characterised in that the monitoring means analyses the change in the electrical properties of the solenoid coil caused by the change in the position of the plunger within the solenoid coil to ascertain the position of the plunger.

Preferably, the analysis of the position of the plunger is used by monitoring means to control the amount of fuel being dispensed.

In use the movement of the plunger of the electrical actuator and the piston means over a predetermined distance will preferably dispense a predetermined amount of fuel The actuator preferably comprises a fixed solenoid coil and a return spring for the movable plunger.

Preferably the monitoring means comprises position measurement circuitry the arrangement being such that in use the solenoid coil provides motive force to the plunger and to the piston means, and the solenoid coil provides positional feedback information of the position of the plunger to the position measurement circuitry of the monitoring means.

Preferably the solenoid coil comprises a single winding with two external electrical connections.

The fuel injector preferably comprises fuel atomisation means, the arrangement being such that in use fuel is forced through the atomisation means by the movement of the actuator; the actuator generating sufficient force to pressurise the fuel too a level which will obtain satisfactory atomisation.

Preferably, the atomisation means is an atomisation orifice.

Preferably the actuator comprises an end stop, the arrangement being such that with no current flowing through the solenoid coil the return spring moves the plunger in a direction towards the end stop; this end stop being referred to as the current off end stop.

Preferably when current is passed through the solenoid coil the plunger moves in a direction away from the current off end stop and the piston means dispenses fuel from the fuel injector.

In use during normal operation the monitoring means preferably provides electrical power to the solenoid coil and energises the solenoid coil for short periods of Time such that the distance the plunger moves away from the current off end is controlled by the duration and level of the pulse of electrical current that is applied to the solenoid coil.

Preferably the monitoring means controls and varies the amount of fuel dispensed by varying the duration of the pulse of electrical current that is applied to the solenoid coil, the arrangement being such that in use the greater the duration of the current pulse that is applied to the solenoid coil the greater the distance moved by the plunger and the piston means and the greater the amount of fuel dispensed.

The monitoring means preferably controls and varies the amount of fuel dispensed by varying the level of current that is passed through the solenoid coil during a current pulse, the arrangement being such that in use the higher the current level that is applied during the current pulse the greater the distance moved by the plunger and the piston means and the greater the mount of fuel dispensed.

Preferably the monitoring means controls the amount of fuel dispensed by varying both the duration of the current pulse and the level of current within that pulse.

Preferably in use the monitoring means applies a current pulse of a predetermined duration and level to the solenoid coil and once the current pulse has ended the monitoring means monitors the position of the plunger as it continues to move in the same direction due to its own momentum, and as the plunger slows to a halt due to the forces exerted upon it by the return spring and the fuel pressure on the end of the piston means, the monitoring means notes the maximum deflection reached by the plunger.

Preferably the monitoring means uses the measurement of the maximum deflection reached by the plunger to establish an empirical relationship between the duration and level of the current pulse, and the distance moved by the plunger.

The monitoring means preferably uses the empirically derived relationship between the duration and level of the current pulse, and the distance moved by the plunger, to predict the duration and level of the current pulse that needs to be applied to the solenoid coil to move the plunger the distance that will dispense a required amount of fuel from the fuel injector.

Preferably in use for any given fuel dispensing stroke of the piston means the monitoring means notes the actual distance moved by the plunger and then compares this distance to a predetermined distance the plunger was required to move in order to deliver predetermined correct amount of fuel; the difference between the predetermined and actual distance provides an error term that is fed into a feedback algorithm that modifies the empirical relationship between the duration and level of the current pulse, and the distance moved by the plunger. This feedback mechanism allows for drift in the performance characteristics of the injector as may be caused by temperature, wear, changes in return spring characteristics, or changes in fuel viscosity.

Preferably when no current is flowing in the solenoid coil and the return spring has returned the plunger to the current off end stop the output from the positional feedback system will be noted and used as an offset reference figure.

Preferably during a fuel dispensing operation the offset reference figure obtained when the plunger is resting on the current off end stop is subtracted from all subsequent positional feedback system output readings to enable the distance moved by the plunger from the current off end stop to be calculated. This means that the absolute value of the positional feedback system output is not important, rather it is the change in the positional feedback system output that indicates the amount of fuel dispensed; this mechanism allows for mid to long term drift in the positional feedback system output as might be caused by temperature, wear or ageing.

The fuel injector preferably comprises a second end stop at the other end of the travel of the plunger against, the arrangement being such that the plunger rests against the second end stop if a current is passed through the solenoid coil for long periods of time. This is referred to as the current on end stop; the mechanical arrangement being tightly toleranced so that the distance the plunger can move between the current off end stop and current on end stop is precisely known; this enabling a positional feedback system calibration operation that is carried out by noting the positional feedback system output with no current flowing through the solenoid coil and plunger resting on the current off end stop, and the positional feedback system output with current flowing through the solenoid coil for a long period and the plunger resting on its current on end stop; the system will then have two positional feedback system output readings a known distance apart which will enable it to calculate the scaling factor of the positional feedback system.

Preferably for some applications during normal operation of an engine the fuel injector is capable of delivering any required amount of fuel for the engine with a stroke of the plunger and piston means that is less than the maximum stroke limit of the injector as dictated by the current on end stop. The amount of fuel can be varied as required by varying the level and or duration of the current pulse applied to the solenoid coil without being limited by the current on end stop; as a result the positional feedback system calibration operation will be not be carried out during normal operation of the engine but will be carried out when the system is commissioned and during routine service operations.

Preferably for some applications the fuel dose will under some circumstances where a higher than normal fuel dose is required, such as cold start, be delivered in one or more strokes, at least one of those strokes being over the full stroke distance of the plunger as dictated by the current on end stop, this enabling the positional feedback system calibration operation to be carried out more frequently.

Preferably for some applications of the fuel injector delivers the fuel in two strokes of the plunger and piston means, at least one of those strokes being over the full stroke distance of the plunger as dictated by the current on end stop, this enabling the positional feedback system calibration operation to be carried out more frequently.

Preferably for some applications the pump assembly comprises two pumps; a primary high pressure pump and a secondary low pressure pump, the arrangement being such that, in use, the primary high pressure pump transfers the metered fuel dose into the engine and the secondary low pressure pump generates positive pressure during an inlet stroke of the primary high pressure pump reducing the tendency for the formation of bubbles within the primary high pressure pump.

The primary high pressure pump preferably comprises a primary piston reciprocatable within a primary cylinder chamber comprising a primary inlet valve and a primary outlet valve.

The secondary low pressure pump preferably comprises a secondary piston reciprocatable within a secondary cylinder chamber comprising a secondary inlet valve and a secondary outlet valve.

The primary piston and the secondary piston are preferably substantially coaxial.

Preferably the diameter of the primary piston is less than the diameter of the secondary piston.

Preferably for some applications the inlet stroke of the primary high pressure pump occurs during the outlet stroke of the secondary low pressure pump; during the outlet stroke of the secondary low pressure pump the pressure of the fuel in the secondary cylinder chamber of the secondary low pressure pump being raised to a value dictated by the opening pressure of the secondary outlet valve of the secondary low pressure pump; the primary inlet valve of the primary high pressure pump being in fluid communication with the cylinder chamber of the secondary low pressure pump and the pressurised fuel therein.

In an embodiment of the present invention for a predetermined plunger movement the volume of fuel displaced by the secondary low pressure pump is considerably greater than the volume of fuel displaced by the primary high pressure pump; as a result during the inlet stroke of the primary high pressure pump and outlet stroke of the secondary low pressure pump only a part of the fuel being pumped by the secondary low pressure pump is drawn into the primary high pressure pump; the excess fuel pumped by the secondary low pressure pump passing through the secondary outlet valve of the secondary low pressure pump so allowing for the generation of net positive pressure during the inlet stroke of the primary high pressure pump as dictated by the opening pressure of the secondary outlet valve of the secondary low pressure pump.

Preferably for some applications of the fuel injector the inlet valve of the primary high pressure pump may be incorporated within the plunger.

According to a second aspect of the invention there is provided a method for detecting the position of a plunger of a fuel injector comprising an electrical actuator comprising a solenoid coil and a movable plunger; a pump assembly comprising piston means being movable by the electrical actuator and monitoring means for controlling the amount of fuel dispensed, the method comprising first moving the plunger and the piston means using the solenoid coil, and characterised in that the method further comprises monitoring the change in the electrical properties of the solenoid coil caused by the change in the position of the plunger within the solenoid coil to ascertain the position of the plunger.

Preferably, the method comprises the step analysing the position of the plunger with the monitoring means and using the analysis for controlling The amount of fuel being dispensed by the fuel injector.

The invention may include any combination of the features or limitations referred to herein.

Figure 2:
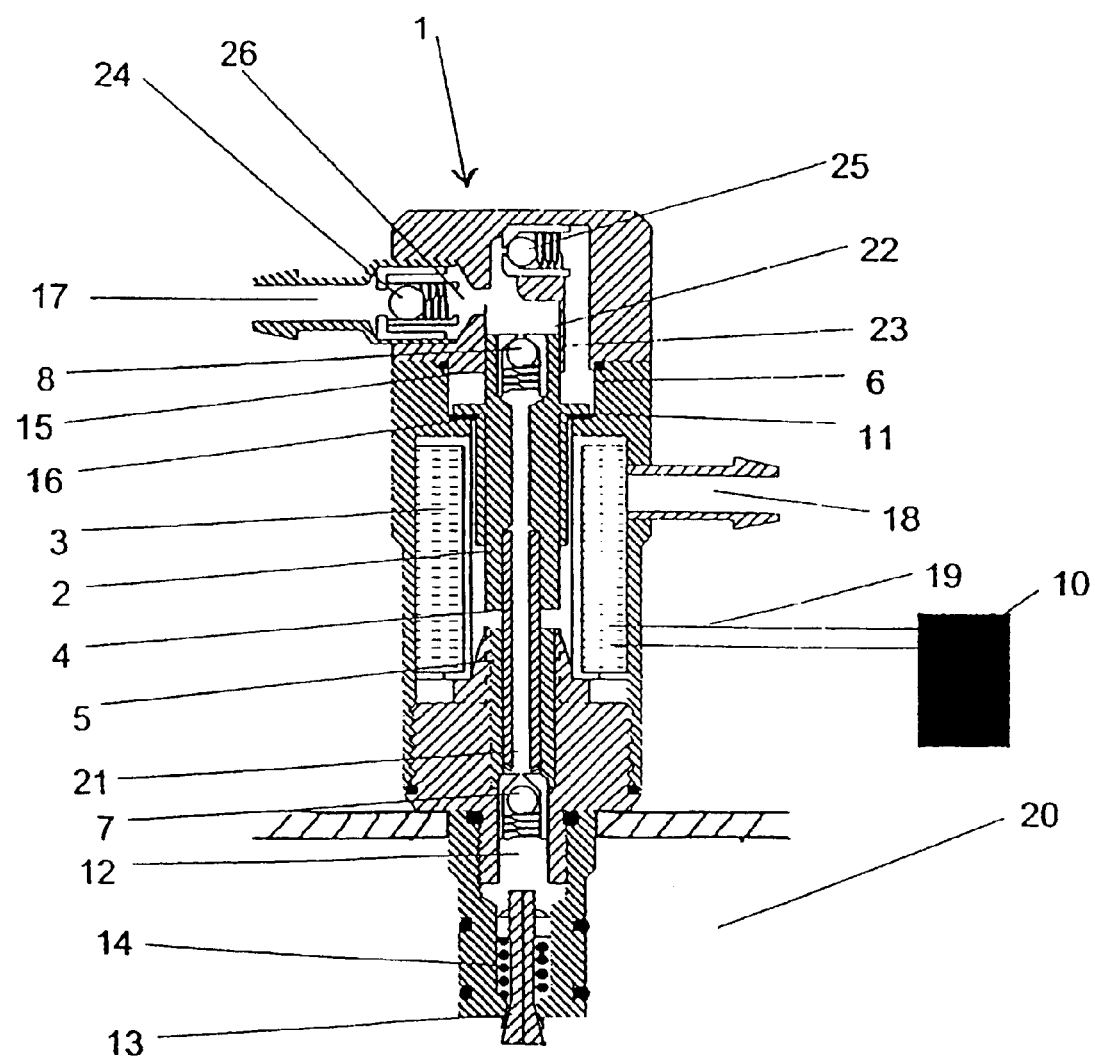

The apparatus may be carried into practice in various ways, but an embodiment of the invention will now be described, by way of example only, with reference to the accompanying drawings, in which:

FIG. 1 is a cross-sectional side elevation of a fuel injector with a solenoid coil de-energised and at the end of the return stroke; and FIG. 2 is a cross-sectional side elevation of the fuel injector shown in FIG. 1 with the solenoid coil energised and at the end of the delivery stroke.

With reference to FIG. 1, an injector 1 which comprises a plunger 2, a solenoid coil 3, and a conical return spring 11 which is driving a primary high pressure pump assembly consisting of a primary piston 4 within a primary cylinder 5 together with primary inlet valve 8 and primary outlet valve 7. The plunger 2 is also driving a secondary low pressure pump assembly consisting of a secondary piston 22, secondary cylinder 23, secondary inlet valve 24 and secondary outlet valve 25. The solenoid coil 3 is under the control of an electronic monitor unit 10 which is connected to the solenoid coil 3 via two connecting wires 19. The injector is mounted in and is delivering fuel into an inlet manifold 20.

The primary piston 4 is linked directly to the plunger 2. The primary piston 4 is precisely toleranced within the primary cylinder 5 to prevent fuel leaking between the primary piston 4 and primary cylinder 5 when the fuel is pressurised. The primary cylinder 5 is made of a material which has a similar coefficient of expansion to the primary piston 4 material to ensure a close tolerance is maintained over a wide temperature range. The primary piston 4 and primary cylinder 5 are made of materials which when combined as a bearing pair have suitable wear characteristics to provide the necessary component life.

The secondary piston 22 is linked directly to the plunger 2. The secondary piston 22 is precisely toleranced within the secondary cylinder 23 to prevent fuel leaking between the secondary piston 22 and secondary cylinder 23 when the fuel is pressurised. The secondary cylinder 23 is made of a material which has a similar coefficient of expansion to the secondary piston 22 material to ensure a close tolerance is maintained over a wide temperature range. The secondary piston 22 and secondary cylinder 23 are made of materials which when combined as a bearing pair have suitable wear characteristics to provide the necessary component life. The secondary piston 22 is of greater diameter than the primary piston 4 to ensure that for a given movement of the plunger 2 the secondary pump assembly will displace a greater volume of fuel than the primary pump assembly. This ensures that a positive pressure can be generated within the secondary pressurisation chamber 26 during the inlet stroke of the primary high pressure pump assembly.

The maximum travel of the plunger is limited by two end stops, the current off end stop 15 and the current on end stop 16. When at rest with no current passing though the solenoid coil 3 the plunger 2 is held against the current off end 15 stop by the return spring 11. FIG. 1 shows the injector in this state. When the solenoid coil 3 is permanently energised the plunger 2 is held against the current on end stop 16. FIG. 2 shows the injector in this state. The maximum distance the plunger 2 can move between the two end stops is known and precisely toleranced. This enables a self calibration operation to take place. This is described below.

During normal operation the plunger 2 will not move as far as the current on end stop 16 as this would limit the amount of fuel that the injector can deliver. The injector will be designed such that the volume of fuel delivered by moving the plunger 2 from its current off end stop 15 to its current on end stop 16 will be greater than the maximum fuel dose required during normal operation.

Primary inlet valve 8 is a low mass fast response one way valve installed within the moving plunger. The valve shown consists of a ball and compression spring but a reed valve or any other suitable design of one way valve could be employed. The primary inlet valve 8 will open when the pressure of the fuel in the secondary pressurisation chamber 26 exceeds the pressure of the fuel in the primary pressurisation chamber 21 by the opening pressure of the primary inlet valve 8. A drilling within the primary piston 4 provides a path for the fuel to flow from the secondary pressurisation chamber 26 to the primary pressurisation chamber 21. The primary inlet valve 8 is designed to minimise the pressure required for it to open.

Primary outlet valve 7 is a low mass fast response one way valve. The valve shown consists of a ball and compression spring but a reed valve or any other suitable design of one way valve could be employed. The primary outlet valve 7 will open when the pressure of the fuel in the primary pressurisation chamber 21 exceeds the pressure in the atomisation valve chamber 12 by the opening pressure of the primary outlet valve 7.

The atomisation valve consists of an atomisation pintle valve 13 held closed by a atomisation valve spring 14. When the pressure of the fuel in the atomisation valve chamber 12 rises lo a level that exerts enough force on the atomisation pintle valve 13 to compress the atomisation valve spring 14 the valve will open. The advantage of this atomisation mechanism is that the atomisation pressure will be constant. The atomisation valve spring 14 compression force would normally be set to give an atomisation pressure of at least 3 bar.

Secondary inlet valve 24 is a low mass fast response one way valve. The valve shown consists of a ball and compression spring but a reed valve or any other suitable design of one way valve could be employed. The secondary inlet valve 24 will open when the pressure of the fuel in the fuel inlet 17 exceeds the pressure of the fuel in the secondary pressurisation chamber 26 by the opening pressure of the secondary inlet valve 24. The secondary inlet valve 24 is designed to minimise the pressure required for it to open.

Secondary outlet valve 25 is a low mass fast response one way valve. The valve shown consists of a ball and compression spring but a reed valve or any other suitable design of one way valve could be employed. The secondary outlet valve 25 will open when the pressure of the fuel in the secondary pressurisation chamber 26 exceeds that in the end stop chamber 6 by the opening pressure of the secondary outlet valve 25. The opening pressure of the secondary outlet valve 25 dictates the pressure in the secondary pressurisation chamber 26 during the inlet stroke of the primary high pressure pump assembly. It will be set at a value that ensures no bubbles form within the fuel during this phase of operation.

The injector is also provided with a positional feedback system. This consists of position measurement circuitry within the monitor unit 10 which utilises the change in electrical characteristics of the solenoid coil 3 as the plunger 2 moves within it.

Fuel is supplied into the main body of the injector by a fuel inlet 17. A fuel outlet 18 provides a return path to the fuel tank. As the plunger reciprocates the secondary low pressure pump assembly circulates fuel through the injector and back to the tank, a proportion of this fuel being drawn off by the primary high pressure pump assembly for injection into the engine. A path for the excess fuel is provided through the secondary outlet valve 25, the end stop chamber 6, between the plunger 2 and the inside of the solenoid coil 3, and finally around the outside of the solenoid coil 3 to the fuel outlet 18. The plunger 2 and solenoid coil 3 are thus immersed in circulating fuel which helps to carry away heat from these components.

The end stop chamber 6 is full of fuel. When the plunger 2 makes contact with the current off end stop 15 or the current on end stop 16 the fuel will act as a damper to prevent the plunger 2 bouncing. It will also dampen out any mechanical noise.

The injector 1 operates as follows. By interrogating various sensors around the engine the electronic monitor unit 10 calculates the amount of fuel it wishes to deliver. From a simple volumetric calculation the electronic monitor unit 10 calculates how far the piston 4 must be moved to deliver this amount of fuel. At the start of the injection operation the plunger 2 will be held against its current off end stop 15 by the return spring 11. In this state all the pump valves will be closed. From previous fuel injection operations the electronic monitor unit 10 will have built up an empirical relationship between solenoid coil current pulse duration and plunger movement. This relationship will take the form of a programmable lookup table or similar. The empirical relationship is used to predict the length of time the solenoid coil 3 must be energised to displace the plunger 2 and the attached primary piston 4 a required distance from the current off end stop. The electronic monitor unit 10 calculates the duration of current pulse that will produce the required movement from the empirical relationship and applies this current pulse to the solenoid coil 3. The magnetic field in the solenoid coil 3 moves the plunger 2 towards it and drives the primary piston 4 down the primary cylinder 5, also moving the secondary piston 22 down the secondary cylinder 23.

As the primary piston 4 moves down the primary cylinder 5 the pressure of the fuel in the primary pressurisation chamber 21 will increase until it exceeds the fuel pressure in the atomisation chamber 12 by the opening pressure of the primary outlet valve 7 causing this valve to open. The fuel pressure in the atomisation chamber 12 will then increase to such a level as to open the atomisation pintle valve 13 by compressing the atomisation valve spring 14, this pressure typically being at least 3 bar to ensure good atomisation. The fuel will then flow through the primary outlet valve 7 and through the atomisation valve 13 into the inlet manifold 20.

During this injection stroke the pressure of the fuel in the secondary pressurisation chamber 26 will drop until the pressure of the fuel in the fuel inlet line 17 will exceed it by the opening pressure of the secondary inlet valve 24 causing that valve to open. Fuel will then be drawn into the secondary pressurisation chamber 26. The secondary inlet valve 24 is optimised to cause the minimum possible pressure drop during this secondary inlet phase, but even so there may be a tendency for bubbles to form within the secondary pressurisation chamber 26. However any bubbles formed will not cause problems unless they are subsequently drawn into the primary high pressure pump assembly. The secondary pressurisation chamber 26 is thus designed so that any bubbles formed tend to float to the top of the secondary pressurisation chamber 26 where they are as close as possible to the secondary outlet valve 25 and as far as possible away from the primary inlet valve 8. They will then be purged out of the secondary pressurisation chamber 26 into the end stop chamber 6 during the secondary low pressure pump outlet stroke.

The plunger 2 will continue to accelerate whilst current is passed through the solenoid coil 3, reaching maximum velocity at the end of the current pulse. The plunger 2 will then continue to move in the same direction under its own momentum but will be decelerating under the force of the return spring 11, the force of the fuel pressure in the primary pressurisation chamber 21 on the end of the primary piston 4 and the force of the fuel depression in the secondary pressurisation chamber 26 on the secondary piston 22. During this deceleration phase the electronic monitor unit 10 will use the position measurement circuitry contained within it to continuously monitor the position of the plunger 2 by monitoring the electrical characteristics of the solenoid coil 3. The electronic monitor unit 10 will note the maximum displacement indicated by the position measurement circuitry which will occur when the force of the return spring 11 and primary and secondary fuel pressures bring the plunger 2 to a halt at the apogee of its travel. The primary outlet valve 7 and atomisation valve 13 will then close and the return spring 11 will then start to accelerate the plunger 2 back towards its current off end stop 15.

At the start of this return stroke the secondary inlet valve 24 will close and the pressure of the fuel in the secondary pressurisation chamber 26 will rise until it exceeds the pressure of the fuel in the end stop chamber 6 by the opening pressure of the secondary outlet valve 25 causing this valve to open. The opening pressure of the secondary outlet valve 25 will be set to a value that prevents any significant bubble formation during this phase of operation. This will typically be between 0.2 and 0.4 bar. The pressure of the fuel in the primary pressurisation chamber 21 will fall until the pressure of the fuel in the secondary pressurisation chamber 26 exceeds the pressure of the fuel in the primary pressurisation chamber 21 by the opening pressure of the primary inlet valve 8, the primary inlet valve 8 will then open and fuel will be forced into the primary pressurisation chamber 21 from the secondary pressurisation chamber 26. Because the diameter of the secondary piston 22 is considerably greater than that of the primary piston 4 only a proportion of the fuel pumped by the secondary piston 22 will be drawn into the primary pressurisation chamber 21, the excess being forced through the secondary outlet valve 25 and back to the fuel tank via the end stop chamber 6, and the cooling passages around the plunger 2 and solenoid coil 3.

Once the plunger 2 reaches its current off end stop 15 the electronic monitor unit 10 will note the output of the positional feedback system with the plunger 2 resting on its current off end stop 15. It will then subtract this offset reading from the positional feedback system output that was noted with the plunger 2 at its maximum deflection to give the total movement of the plunger 2 and attached primary piston 4. This movement will be compared to the required distance that it was originally intended to move the plunger 2 and attached primary piston 4. Any error term will be used to provide feedback to correct the empirical relationship between solenoid current pulse duration and piston movement for future injection operations. For example if the plunger 2 and attached primary piston 4 were moved slightly less than the intended distance the solenoid pulse tables will be increased so that the next time an injection operation is carried out the solenoid coil 3 will be energised for slightly longer.

A self calibration operation may be carried out at intervals to calibrate the positional feedback system. The electronic monitor unit 10 will first note the output of the positional feedback system with the solenoid coil 3 switched off and the plunger 2 in contact with its current off end stop 15. FIG. 1 shows the plunger 2 in this position. The electronic monitor unit 10 will then switch the solenoid coil 3 on for a comparatively long period to allow the plunger 2 to come into contact with its current on end stop 16. FIG. 2 shows the plunger 2 in this position. The electronic monitor unit 10 will then note the output of the positional feedback system. The electronic monitor unit 10 now has two output readings from the positional feedback system a known distance apart, hence it can calibrate the scaling factor of the positional feedback system.

An important advantage of the apparatus shown is that it does not need a separate high pressure fuel supply. This saves cost, weight and space. These savings are particularly important on single cylinder applications such as low capacity motorbikes where the high pressure fuel system represents a very large overhead. The high pressure fuel system is also potentially hazardous and eliminating it presents an important safety advantage. Again this is particularly important for two wheeled applications where the operator is not as remote from the fuel system as they are in an automobile.

An important advantage of the apparatus shown is that it meters the fuel delivered from first principles, that is by a simple volumetric calculation related to the distance the actuator moving magnet assembly is moved. It is thus not subject to some of the fuel delivery errors that a conventional electronic fuel injection system is subject to due to variations in injector orifice diameter, and injector orifice pressure differential.

An important advantage of the apparatus shown is that higher injector pressures are both feasible and safe. Higher injector pressures lead to improved atomisation which leads to improved combustion efficiency and reduced emissions. By providing a stronger drive signal and higher atomisation valve opening pressures injection pressures of 18 to 40 bar are readily obtainable using actuators currently available. Providing an injection pressure of 40 bar with an external fuel pump and regulator would be both expensive due to the heavy duty pumps and fuel line required, and potentially hazardous.

An important advantage of the apparatus shown is that it utilises a single solenoid coil to both drive the plunger, and to monitor the position of that plunger. This means the device is simple in construction, cheap to produce, and requires fewer electrical connections to the outside world.

An important advantage of the apparatus shown is that the integral secondary low pressure pump will suppress the production of bubbles within the fuel during the inlet stroke of the primary high pressure pump. During the inlet stroke of the primary high pressure pump the fuel will be subjected to a reduction in pressure as it flows through the primary inlet valve. When injecting a fuel containing constituents with low boiling points, for example gasoline, there is a tendency for this reduction in pressure to cause bubbles to form within the fuel in the primary pressurisation chamber. Such bubbles will cause errors in the metering of the fuel. The integral secondary low pressure pump pressurises the fuel during the inlet stroke of the primary high pressure pump limiting bubble formation. The secondary low pressure pump also circulates fuel through the injector purging any bubbles that do form within the secondary pressurisation chamber.

The current invention may be operated without an integral secondary low pressure pump. If this is the case the current invention may require an external secondary low pressure pump to provide a circulatory flow through the injector. This external secondary low pressure pump both provides a small positive pressure to reduce the tendency for bubble formation, and will also flush through the injector any bubbles that do form.

The above embodiments all show injectors which are injecting fuel into the inlet manifold of an engine. The apparatus shown could also be used to inject directly into the engine cylinder. This can reduce the emissions from an engine, as the injection can be carried out after the exhaust valve has closed, preventing fuel short circuiting between the inlet and exhaust valves. This is a particular problem on two stroke engines and four stroke engines with large valve overlaps. The apparatus shown has two advantages over conventional systems for this application. Firstly as has been outlined above it can readily generate higher injection pressures. This is necessary for direct cylinder injection to overcome the pressure in the cylinder which may be higher than that in the manifold. Secondly the amount of fuel dispensed is metered from first principles and will not be affected by the variations in cylinder pressure which will occur as the piston moves in the bore on the compression stroke. If a conventional fuel injection system is used, where fuel flow is determined by the pressure drop across the injector orifice, these pressure variations make metering the fuel complex and subject to error.

What is claimed is:

1. A fuel injector characterised in that the fuel injector comprises an electrical actuator comprising a solenoid coil and a movable plunger; a pump assembly comprising piston means being movable by the electrical actuator; and monitoring means for controlling the amount of fuel dispensed, the arrangement being such that, in use, fuel is dispensed from the fuel injector by the movement of the plunger and the piston means, and the monitoring means analyses the change in the electrical properties of said solenoid coil caused by the change in the position of the plunger within said solenoid coil to ascertain the position of the plunger.

2. A fuel injector as claimed in claim 1, wherein the analysis of the position of the plunger is used by monitoring means to control the amount of fuel being dispensed.

3. A fuel injector as claimed in claim 1 or claim 2, wherein in use the movement of the plunger of the electrical actuator and the piston means over a predetermined distance will dispense a predetermined amount of fuel.

4. A fuel injector as claimed in claim 1, wherein the actuator comprises a fixed solenoid coil and a return spring for the movable plunger.

5. A fuel injector as claimed in claim 1, wherein the monitoring means comprises position measurement circuitry the arrangement being such that in use the solenoid coil provides motive force to the plunger and to the piston means, and the solenoid coil provides positional feedback information of the position of the plunger to the position measurement circuitry of the monitoring means.

6. A fuel injector as claimed in claim 2, wherein the solenoid coil comprises a single winding with two external electrical connections.

7. A fuel injector as claimed in claim 2, wherein the fuel injector comprises fuel atomisation means, the arrangement being such that in use fuel is forced through the atomisation means by the movement of the actuator; the actuator generating sufficient force to pressurise the fuel to a level which will obtain satisfactory atomisation.

8. A fuel injector as claimed in claim 7, wherein the atomisation means is an atomisation orifice.

9. A fuel injector means as claimed in claim 4, wherein the actuator comprises an end stop, the arrangement being such that with no current flowing through the solenoid coil the rectum spring moves the plunger in a direction towards the end stop.

10. A fuel injector means as claimed in claim 9, wherein when current is passed through the solenoid coil the plunger moves in a direction away from the end stop and the piston means dispenses fuel from the fuel injector.

11. A fuel injector means as claimed in claim 9, wherein in use during normal operation the monitoring means provides electrical powers to the solenoid coil for short periods of time such that the distance the plunger moves away from the end stop is controlled by the duration and level of the pulse of electrical current that is applied to the solenoid coil.

12. A fuel injector means as claimed in claim 11, wherein the monitoring means controls and varies the amount of fuel dispensed by varying the duration of the pulse of electrical current that is applied to the solenoid coil, the arrangement being such that in use the greater the duration of the current pulse that is applied to the solenoid coil the greater the distance moved by the plunger and the piston means and the greater the amount of fuel dispensed.

13. A fuel injector means as claimed in claim 12, wherein the monitoring means controls and varies the amount of fuel dispensed by varying the level of current that is passed through the solenoid coil during a current pulse, the arrangement being such that in use the higher the current level that is applied during the current pulse the greater the distance moved by the plunger and the piston means and the greater the mount of fuel dispensed.

14. A fuel injector means as claimed in claim 13, wherein the monitoring means controls the amount of fuel dispensed by varying both the duration of the current pulse and the level of current within that pulse.

15. A fuel injector means as claimed in claim 13, wherein in use the monitoring means applies a current pulse of a predetermined duration and level to the solenoid coil and once the current pulse has ended the monitoring means monitors the position of the plunger as it continues to move in the same direction due to its own momentum, and as the plunger slows to a halt due to the forces exerted upon it by the return spring and the fuel pressure on the end of the piston means, the monitoring means notes the maximum deflection reached by the plunger.

16. A fuel injector means as claimed in claim 15, wherein the monitoring means uses the measurement of the maximum deflection reached by the plunger to establish an empirical relationship between the duration and level of the current pulse, and the distance moved by the plunger.

17. A fuel injector means as claimed in claim 16, wherein the monitoring means uses the empirically derived relationship between the duration and level of the current pulse, and the distance moved by the plunger, to predict the duration and level of the current pulse that needs to be applied to the solenoid coil to move the plunger the distance that will dispense a required amount of fuel from the fuel injector.

18. A fuel injector means as claimed in claim 17, wherein in use for any given fuel dispensing stroke of the piston means the monitoring means notes the actual distance moved by the plunger and then compares this distance to a predetermined distance the plunger was required to move in order to deliver predetermined correct amount of fuel; the difference between the predetermined and actual distance provides an error term that is fed into a feedback algorithm that modifies the empirical relationship between the duration and level of the current pulse, and the distance moved by the plunger.

19. A fuel injector means as claimed in claim 9, wherein in use when no current is flowing in the solenoid coil and the return spring has returned the plunger to the end stop, the monitoring means uses the value of the electrical properties of the solenoid coil at this point as an offset reference value.

20. A fuel injector means as claimed in claim 19, wherein during a fuel dispensing operation the offset reference value obtained when the plunger is resting on the end stop is subtracted from all subsequent output readings from the solenoid coil to enable the distance moved by the plunger from the end stop to be calculated.

21. A fuel injector as claimed in claim 20, wherein the fuel injector comprises a second end stop at the other end of the travel of the plunger, the arrangement being such that the plunger rests against the second end stop if a current is passed through the solenoid coil for long periods of time.

22. A fuel injector as claimed in claim 21, wherein the fuel injector is capable of delivering any required amount of fuel for the engine with a stroke of the plunger and piston means that is less than the maximum stroke limit of the injector as dictated byte second end stop.

23. A fuel injector as claimed in claim 22, wherein at least one of the strokes of the plunger is over the full stroke distance of the plunger as dictated by the second end stop, this enabling the positional feedback system calibration operation to be carried out more frequently.

24. A fuel injector as claimed in claim 21, wherein the fuel injector delivers the fuel in two strokes of the plunger and piston means, at least one of those strokes being over the full stroke distance of the plunger as dictated by the second end stop, this enabling the positional feedback system calibration operation to be carried out more frequently.

25. A fuel injector as claimed in claim 1, wherein the pump assembly comprises two pumps; a primary high pressure pump and a secondary low pressure pump, the arrangement being such that, in use, the primary high pressure pump transfer the fuel into an engine and the secondary low pressure pump generates positive pressure during an inlet stroke of the primary high pressure pump reducing the tendency for the formation of bubbles within the primary high pressure pump.

26. A fuel injector as claimed in claim 25, wherein the primary high pressure pump comprises a primary piston reciprocatable within a primary cylinder chamber comprising a primary inlet valve and a primary outlet valve.

27. A fuel injector as claimed in claim 25, wherein the secondary low pressure pump comprises a secondary piston reciprocatable within a secondary cylinder chamber comprising a secondary inlet valve and a secondary outlet valve.

28. A fuel injector as claimed in claim 27, wherein the primary piston and the secondary piston are substantially coaxial.

29. A fuel injector as claimed in claim 28, wherein the diameter of the primary piston is less than the diameter of the secondary piston.

30. A fuel injector as claimed in claim 29, wherein in use the inlet stroke of the primary high pressure pump occurs during the outlet stroke of the secondary low pressure pump; during the outlet stroke of the secondary low pressure pump the pressure of the fuel in the secondary cylinder chamber of the secondary low pressure pump being raised to a value dictated by the opening pressure of the secondary outlet valve of the secondary low pressure pump; the primary inlet valve of the primary high pressure pump being in fluid communication with the secondary cylinder chamber of the secondary low pressure pump and the pressurized fuel therein.

31. A fuel injector as claimed in claim 25, wherein in use a predetermined plunger movement the volume of fuel displaced by the secondary low pressure pump is considerably greater than the volume of fuel displaced by the primary high pressure pump; as a result during the inlet stroke of the primary high pressure pump and outlet stroke of the secondary low pressure pump only a part of the fuel being pumped by the secondary low pressure pump is drawn into the primary high pressure pump; the excess fuel pumped by the secondary low pressure pump passing through the secondary outlet valve of the secondary low pressure pump so allowing for the generation of net positive pressure during the inlet stroke of the primary high pressure pump as dictated by the opening pressure of the secondary outlet valve of the secondary low pressure pump.

32. A fuel injector as claimed in claim 25, wherein the fuel injector the primary inlet valve of the primary high pressure pump may be incorporated within the plunger.

33. A method fur detecting the position of a movable plunger of a fuel injector comprising an electrical actuator comprising a solenoid coil and the movable plunger; a pump assembly comprising piston means being movable by the electrical actuator and monitoring means fur controlling the amount of fuel dispensed characterised in that the method comprises first moving the plunger and the piston means using the solenoid coil, and then monitoring the change in the electrical properties of the solenoid coil caused by the change in the position of the plunger within the solenoid coil to provide the position of the plunger.

34. A method for detecting the position of a movable plunger as claimed in claim 33, wherein the method comprises the analysis of the position of the plunger by the monitoring means and the use of the analysis for controlling the amount of fuel being dispensed by the fuel injector.

* * * * *

UNITED STATES PATENT AND TRADEMARK OFFICE
CERTIFICATE OF CORRECTION

PATENT NO. : 6,877,679 B2
DATED : April 12, 2005
INVENTOR(S) : K.T. Lawes

It is certified that error appears in the above-identified patent and that said Letters Patent is hereby corrected as shown below:

Title page,
Item [76], Inventor, "IJN" should read -- 1JN --.

Column 11,
Line 24, "rectum" should read -- return --.

Column 12,
Line 41, "byte" should read -- by the --.
Line 57, "transfer" should read -- transfers --.

Column 14,
Lines 11 and 15, "fur" should read -- for --.

Signed and Sealed this

Twenty-third Day of August, 2005

JON W. DUDAS
*Director of the United States Patent and Trademark Office*